(12) United States Patent
Trifonov et al.

(10) Patent No.: US 7,227,955 B2
(45) Date of Patent: Jun. 5, 2007

(54) SINGLE-PHOTON WATCH DOG DETECTOR FOR FOLDED QUANTUM KEY DISTRIBUTION SYSTEM

(75) Inventors: Alexei Trifonov, Boston, MA (US); Harry Vig, North Billerica, MA (US)

(73) Assignee: Magiq Technologies, Inc., New York, NY (US)

( * ) Notice: Subject to any disclaimer, the term of this patent is extended or adjusted under 35 U.S.C. 154(b) by 722 days.

(21) Appl. No.: 10/670,979

(22) Filed: Sep. 25, 2003

(65) Prior Publication Data

US 2004/0161109 A1 Aug. 19, 2004

Related U.S. Application Data

(60) Provisional application No. 60/445,805, filed on Feb. 7, 2003.

(51) Int. Cl.
*H04K 1/00* (2006.01)

(52) U.S. Cl. .................. 380/256; 380/278; 380/283

(58) Field of Classification Search .......... 380/278, 380/256, 283

See application file for complete search history.

(56) References Cited

U.S. PATENT DOCUMENTS

| | | | |
|---|---|---|---|
| 5,307,410 A | | 4/1994 | Bennett |
| 5,850,441 A | * | 12/1998 | Townsend et al. .......... 380/283 |
| 5,953,421 A | * | 9/1999 | Townsend .................. 380/283 |
| 6,188,768 B1 | * | 2/2001 | Bethune et al. ............. 380/278 |
| 6,438,234 B1 | | 8/2002 | Gisin et al. |
| 6,529,601 B1 | * | 3/2003 | Townsend .................. 380/256 |

OTHER PUBLICATIONS

Muller et al, "'Plug and Play' Systems for Quantum Crpto-graphy," Appl. Phys. Lett. 70 (7) Feb. 17, 1997.
Stucki et al, "Quantum Key Distribution over 67km with a Plug & Play System", New Journal of Physics 4 (2002) 41.1-41.8.
Gisin et al, "Quantum Crytography" Rev. Mod. Phys., vol. 74, No. 1, Jan. 2002 1 pgs.
Muller et al., "Experimental Demonstration of Quantum Cryptography Using Polarized Photons in Optical Filore Over More Than 1 km," Europhys. Lett, 23(6) pp. 383-388 (1993).

* cited by examiner

*Primary Examiner*—Hosuk Song
*Assistant Examiner*—April Y. Shan
(74) *Attorney, Agent, or Firm*—Opticus IP Law PLLC

(57) ABSTRACT

A single-photon "watch dog" detector for a two-way quantum key distribution (QKD) system. The detector can detect weak probe signals associated with a Trojan horse attack, or weak substitute signals associated with a "man in the middle" attacks. The detector provides for a significant increase in security for a two-way QKD system over the prior art that employs a conventional detector such as a photodiode. By counting the number of weak pulses entering and/or leaving the reflecting QKD station (Alice), an eavesdropper that attempts to add weak pulses to the quantum channel in order to gain phase information from the phase modulator at Alice can be detected.

13 Claims, 4 Drawing Sheets

SINGLE-PHOTON WATCH DOG DETECTOR FOR FOLDED QUANTUM KEY DISTRIBUTION SYSTEM

CLAIM OF PRIORITY

This patent application claims priority from U.S. Provisional Patent Application No. 60/445,805, filed on Feb. 7, 2003.

FIELD OF THE INVENTION

The present invention relates to quantum cryptography, and in particular relates to apparatus and methods for enhancing security when performing quantum key distribution (QKD) using a "two-way" folded optical system.

BACKGROUND OF THE INVENTION

Quantum key distribution involves establishing a key between a sender ("Alice") and a receiver ("Bob") by using weak (e.g., 0.1 photon on average) optical signals transmitted over a "quantum channel. " The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). A specific QKD system is described in U.S. Pat. No. 5,307,410 to Bennet (the '410 patent).

The Bennett-Brassard article and the '410 patent each describe a so-called "one-way" QKD system wherein Alice randomly encodes the polarization of single photons, and Bob randomly measures the polarization of the photons. The one-way system described in the '410 patent is based on a two-part optical fiber Mach-Zehnder interferometer. Respective parts of the interferometer are accessible by Alice and Bob so that each can control the phase of the interferometer. The signals (pulses) sent from Alice to Bob are time-multiplexed and follow different paths. As a consequence, the interferometers need to be actively stabilized to within a few tens of nanometers during transmission to compensate for thermal drifts. This is generally inconvenient for practical applications involving transmission distances measured in kilometers.

U.S. Pat. No. 6,438,234 to Gisin (the '234 patent'), which patent is incorporated herein by reference, discloses a so-called "two-way" QKD system that is autocompensated for polarization and thermal variations. FIG. 1 is a schematic diagram of the QKD device according to the '234 patent, and further including an optical delay line DL, the role of which is discussed below.

The device includes Alice and Bob connected by an optical fiber 3. Bob includes a 2×2 coupler 12. In principle, Bob's side is an unbalanced Michelson interferometer with one long arm going to Alice. Bob's side includes a pulsed laser 10, a first coupler 11, a Faraday mirror 16, a second coupler 12, a phase modulator 13, a second Faraday mirror 14 and a single photon detector 17. The laser 10 may be, e.g., a DFB laser and produces e.g. 300 picosecond (ps) long pulses at 1300 nm, with a repetition rate of e.g. 1 MHz. Alice's side includes a coupler 20, a "normal" detector 23 (i.e., a non-single-photon detector), a phase modulator 21, a Faraday mirror 22 and an attenuator 24 controlled by the detector 23.

Bob initiates transmission by sending a short, relatively strong laser pulse towards Alice. The pulse arriving in the coupler 12 is split into two parts (pulses), P1 and P2 (not shown). P1 goes directly towards Alice and P2 is first delayed by one bounce in the mirrors 14 and 16 (delay line). Pulses P1 and P2, travel down the fiber to Alice. The two pulses are split at coupler 20, with the majority of the pulse going to detector 23 so that weak pulses are sent through phase modulator 21. In order to encode her bits, Alice lets the first pulse P1 be reflected by mirror 22, but modulates the phase (phase shift $\phi_A$) of the second pulse P2 using phase modulator 21 situated in front of Faraday mirror 22 The two pulses then travel back to Bob.

Detection on Bob's side is done by delaying part of P1 in the same delay line 14-16. Bob lets pulse P2 pass unaltered but modulates the phase of the first pulse P1 with the phase modulator 13 situated in front of the mirror 14 (phase shift $\phi_B$). This pulse then interferes with P2. If the phase modulators at both Alice's and Bob's are off, or if the difference $\phi_A - \phi_B = 0$ (same phase shift applied to the two pulses P1 and P2), then the interference will be constructive (the two pulses follow exactly the same path). If however Alice or Bob change their phase setting between the two pulses, the interference may become destructive. Totally destructive interference is obtained when $\phi_A - \phi_B = \pi$. In this case no light is detected at single photon detector 17. Note that it is essential that the interference obtained when the phase shifts are different is totally destructive. This ensures that, when Bob obtains a detection event, he can be certain that Alice did not use a different phase, and thus that she used the same phase as Bob.

Because coupler 20 sends most of the light to detector 23, this detector is a convention detector, such as a PIN photodiode. Further, coupler 20 serves to attenuate the signal down to below the single-photon level (on average) needed to ensure protection against an eavesdropper (not shown). In addition, detector 23 can serve to monitor the intensity of the incoming signals from Bob and watch for a so-called "Trojan horse" attack, whereby an eavesdropper sends a strong probing pulse through Alice in order to read the value of her phase shifted reflected pulses.

As discussed in the article by Gisin et al., entitled "Quantum Cryptography," Rev. Mod. Phys., Vol. 74, No. 1, January 2002, on pages 172-173, the intrinsically bi-directional nature of the reflective QKD system makes Rayleigh backscattering a cause of concern. With continuing reference to FIG. 1, light pulses P1 and P2 emitted by Bob into optical fiber 3 undergo scattering by inhomogeneities in the optical fiber material, and a small fraction of this light (~1%) is recaptured by the fiber and travels backwards towards Bob. The backward traveling light can combine with phase-encoded signals returning to Bob from Alice, causing false counts at Bob.

To solve this problem, the QKD system described in the '234 and shown in FIG. 1 needs to further include the aforementioned optical delay line DL (e.g., an optical fiber spool) in Alice in which trains of pulses sent by Bob are stored. This ensures that pulses traveling to and from Bob are not simultaneously present in optical fiber 3 connecting Bob and Alice.

Another way of solving the problem of Rayleigh backscattering is to have Bob send weaker pulses. However, for this approach to be successful the system must have reduced attenuation, e.g., coupler 22 at Alice must allow much less light to travel to detector 23. Unfortunately, this makes the system more vulnerable to eavesdropping because Eve can use a probing pulse weak enough to avoid being detected by detector 23, which only detect optical signals having on the order of hundreds of photons or greater.

Specifically, the lack of sensitivity of detector 23 makes the two-way system of FIG. 1 vulnerable to two types of attacks: the Trojan horse attack, and the "man in the middle" attack. In an example of a Trojan horse attack, eavesdropper Eve transmits a relatively weak and short probing signal to Alice by tapping into the quantum channel. The probe pulse is timed so that it is sent through Alice's phase modulator 21 at or near the same time (or at or near the center frequency) as the pulse sent by Bob in an effort to obtain information about the phase Alice imparts to the pulse. The signal sent from Bob to Alice that is modulated at Alice and sent back to Bob remains unaffected by the probe signal. Again, for weak probe pulses, conventional detector 23 will not detect this kind of attack.

In a man in the middle attack, Eve places her apparatus between Alice and Bob and pretends that she is Alice or Bob. Eve can prepare weak signals to be transmitted to Alice to ascertain the phase modulator settings for an appropriate time and frequency. In addition, Eve makes a replica of signals modulated by Alice and introduces them onto the optical fiber so that the signals received by Bob appear to be identical. When Eve learns about the original Alice signals, she applies a corresponding phase shift. Due to the loss in the channel, Eve needs to learn only a small fraction of the time bins, which makes this type of attack very powerful.

Again, the presence of ordinary detector 23 cannot prevent such an attack because it is not sensitive enough to detect weak signals (i.e., signals having less than thousands of photons).

SUMMARY OF THE INVENTION

An aspect of the invention is a reflecting key encoding station for a two-way quantum key distribution (QKD) system. The system includes a phase modulator and Faraday mirror arranged to reflect pulses of radiation arriving from a transmitting key encoding station through the phase modulator. The system also includes a controller coupled to the phase modulator. The controller provides a first gating signal to the phase modulator to activate the phase modulator to modulate one of the pulses of radiation. The system further includes a single-photon detector coupled to the controller and gated with a second gating signal from the controller to detect pulses of light entering and/or leaving the reflecting key encoding station.

Another aspect of the invention is a method of improving the security of a two-way quantum key distribution (QKD) system. The method includes providing a reflective key encoding station having a single-photon detector, and monitoring light pulses entering and/or leaving the key encoding station using the single-photon detector.

DETAILED DESCRIPTION OF THE INVENTION

Apparatus

Figure 1:
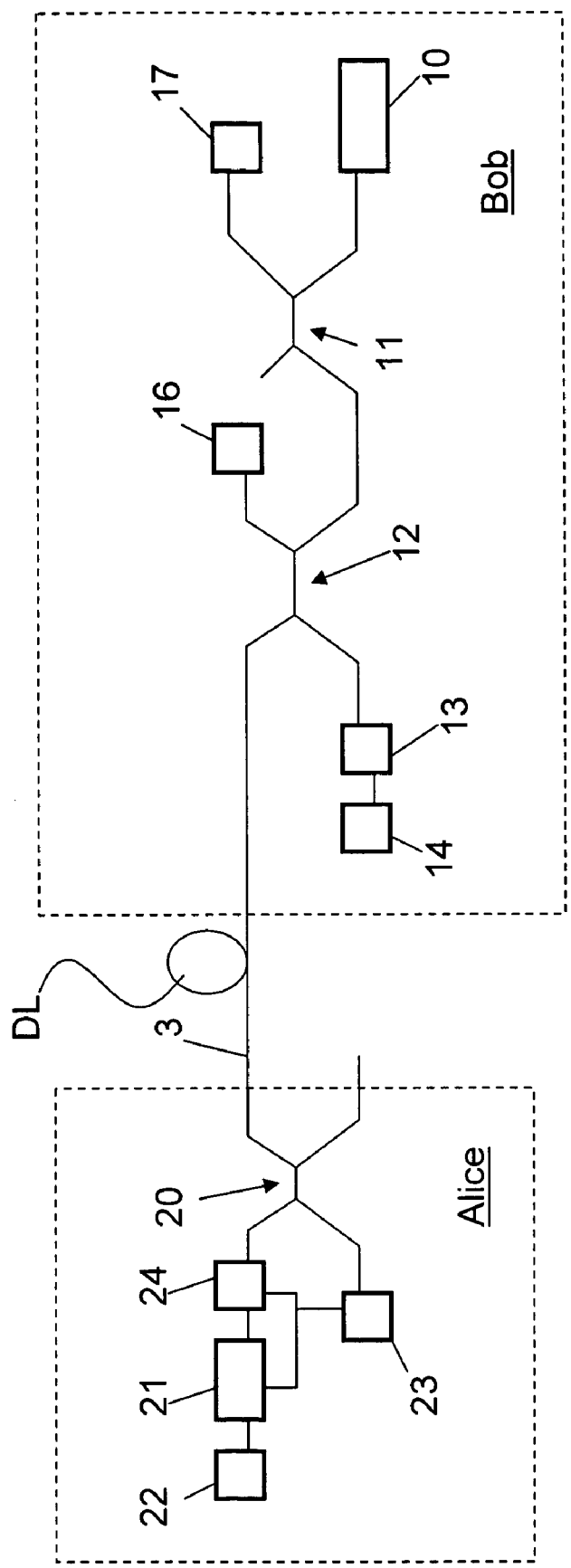
FIG. 1 is schematic diagram of a prior art folded QKD system as described in the '234 patent, and further including a delay line to reduce Rayleigh scattering.
Figure 2:
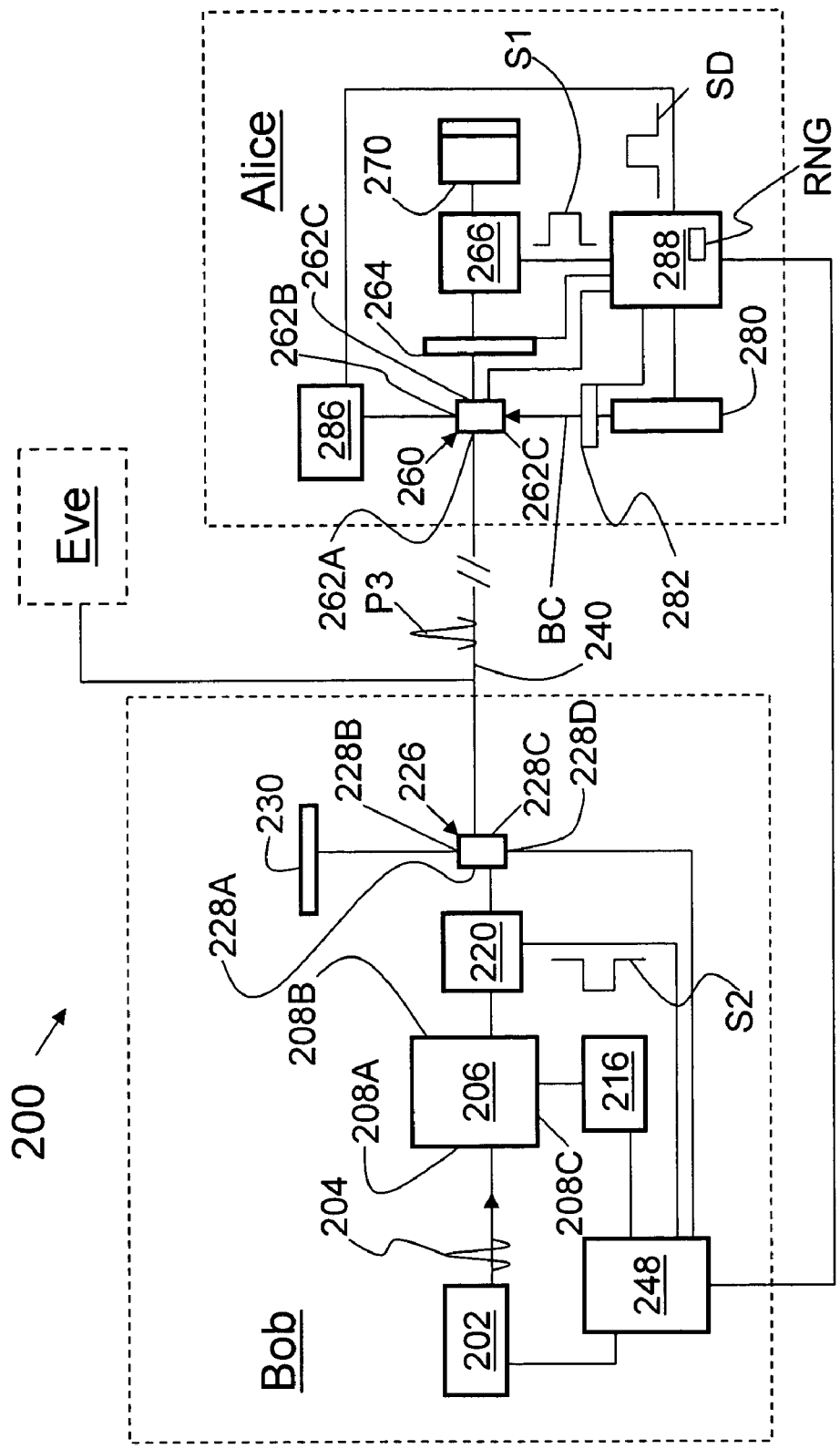
FIG. 2 is a schematic diagram of a folded QKD system that includes a watch-dog detector and related components that improve the security of the folded QKD system.

FIG. 2 is a schematic diagram of a folded QKD system 200 similar to that illustrated in FIG. 1, but simplified to show only the essential components. System 200 includes key encoding stations: transmitting/receiving station Bob and reflecting station Alice, referred to hereinafter simply as Bob and Alice. An eavesdropper Eve is also shown in FIG. 2.

Bob

Bob includes a laser 202 that emits light pulses 204. Laser 200 is coupled to a time-multiplexing/demultiplexing optical system 206 having an input end 208A, an input/output end 208B, and an output end 208C. Optical system 206 received input pulses 204 at input end 208A and splits each pulse into two time-multiplexed pulses (not shown) and outputs them at input/output end 208B. Likewise, optical system 206 receives at input/output end 208B pairs of time-multiplexed pulses coming from Alice and combines (interferes) them into a single pulse, which is directed out of output end 208C.

A single-photon detector 216 is coupled to optical system 206 at output end 208C. A phase modulator (PM) 220 is coupled to optical system input/output end 208B. Bob also includes an optical switching/splitting element 226 arranged downstream of PM 220 and having four ports 228A-228D (in the case of a beamsplitter, the four ports are simply axes 228A-228D). In an example embodiment, element 226 is an ordinary 2×2 beamsplitter. In another example embodiment, element 226 is an active optical switch. PM 220 is connected to port 226A. In an example embodiment, a mirror 230 is coupled to port 226B to perform calibration, as described below. An optical fiber 240 connecting Bob to Alice is coupled to port 226C.

Bob also includes a controller 248 operatively (e.g., electrically) coupled to laser 202, detector 216, PM 220, and to element 226 at port 228D in the case where this element is actively switchable.

Alice

Alice includes an optical switching/splitting element 260 similar to element 226. Element 260 generally includes four ports (axes) 262A-262D. In an example embodiment, element 226 is a beamsplitter (e.g., a 2×2 coupler), while in another example embodiment it is an active optical switch. Optical fiber 240 is coupled to port 262A. A variable optical attenuator (VOA) 264 is arranged downstream of and is coupled to element 260 at port 262C. A phase modulator (PM) 266 is arranged downstream of and is optically coupled to VOA 264. A Faraday mirror 270 is arranged downstream of and is optically coupled to PM 266.

Alice further includes a photon-emitting device 280 (e.g., a laser) coupled port 262D of element 260, and a single-photon detector 286 coupled to port 262B of element 260. Single-photon detector 286 is referred to hereinafter as "watch-dog detector" or WDD 286 because it acts as a guardian against a variety of possible probing attacks that could be launched against Alice. In an example embodiment, WDD 286 has a relatively broad spectral sensitivity in order to detect optical signals (e.g., probe signal P3) having a wavelength different from pulses P1 and P2. In an example embodiment, a VOA 282 is optionally arranged in the path of photon-emitting device 280.

Alice also includes a controller 288 operatively (e.g., electrically) coupled to PM 266, photon-emitting device 280, VOA 264, WDD 286, optional VOA 282 and to element 260 in the case where the element is switchable.

Controllers 248 and 288 are linked (e.g., electrically or optically) to synchronize the operation of Alice and Bob. In particular, the operation of the phase modulators 220 and 266, detector 216 and WDD 286 are coordinated by controllers 248 and 288 using gating signals when a key is exchanged between Alice and Bob.

In the case of element 260 being a beamsplitter, the transmission ratio of the element can vary from about 90%/10% transmittivity (i.e., the transmission from optical fiber 240 through to VOA 264 is 90% and from optical fiber 240 to WDD 286 is 10%), and correspondingly 90% from photon-emitting device 280 to WDD 286 and 10% from VOA 264 to WDD 286.

Operational Assumptions

The following assumptions are made in considering the operation of system 200. First, it is assumed that Alice randomly selects one of the allowed phase settings at PM 266 for a short, known, time interval, and that no information about the setting of PM 266 can be extracted outside of this interval. This is accomplished, for example, by using a gating signal S1 sent from controller 288 to PM 266. Second, it is assumed that Alice optionally includes a narrow band filter (not shown) arranged to suppress eavesdropping attempts that employ wavelengths outside of the bandwidth of detector 286. Third, it is assumed that the Eve cannot change the quantum efficiencies of detector 286 in Alice or detector 216 at Bob, or the loss (attenuation) at Alice or Bob. Fourth, it is assumed that Eve has full access to optical fiber 240 and can modify, block, or substitute optical signals sent over the optical fiber.

Further, it is assumed that Eve also has the limited ability to probe the state of PM 266 (e.g., sending her probe beam through Alice). Therefore, it is assumed that Eve can perform the following:
1. A Trojan horse attack by keeping the signal sent from Bob→Alice→Bob untouched and adding a probe signal;
2. Eve can perform a man-in-the-middle attack by blocking the signal sent from Bob→Alice→Bob and substituting her own signal; and
3. Eve can use a combination of 1 and 2 and try to maximize her information about the quantum key.

In order to prevent Eve from eavesdropping on communication between Alice and Bob, it is required that:
1. Bob's detector(-s) 216 be properly calibrated;
2. The phase-modulated pulses from Alice to Bob have an average number of photons per pulse μ, which may be predefined, and depends on the security analysis of the system;
3. WDD 286 be calibrated to ensure that μ is constant and well-defined;
4. The loss in optical fiber 240 be monitored relative to a baseline loss measurement (e.g., a loss measurement made at the time optical fiber 240 was installed) so that attenuation of the signals due to environmental or physical changes to the fiber is discernable and does not exceed a specified value.

Methods of Operation

With continuing reference to FIG. 2, in the operation of system 200, pulse 204 is divided into two separate pulses P1 and P2 (not shown) by time-multiplexing/demultiplexing optical system 206. In contrast to the prior art QKD system of FIG. 1, pulses P1 and P2 are relatively weak pulses. The pulses are passed out of optical system input/output end 208B to PM 220, which is gated to allow the pulses to pass through unmodulated. Pulses P1 and P2 then pass to Alice over optical fiber 240. Pulses P1 and P2 continue on through element 260 and to VOA 264, which can attenuate the pulses if necessary. The pulses then pass through PM 266 and are reflected by Faraday mirror 270, and pass back through PM 266 a second time.

During one of the passes of pulses P1 and P2 through PM 266, the PM modulates one of the pulses (say, P1). This is achieved by controller 288 sending a well-timed gating signal S1 that activates PM 266 for the short period of time (i.e., less than the time-separation between the pulses) when pulse P1 passes through PM 266. Pulses P1 and P2 then pass back through VOA 264, which again can attenuate the pulses if necessary. The pulses then either pass directly back to Bob, are completely deflected to WDD 286, or a portion of one or each of the pulses is deflected to WDD 286, depending on whether element 260 is an optical switch or a beamsplitter, and the mode of operation of the system.

The interaction of pulses P1 and P2 with element 260 is discussed in detail below. For now, it is assumed they pass directly back to Bob and to element 226, which allows the pulses to proceed to PM 220. PM 220 randomly modulates pulse P2 with one of the select phase modulation values. This is achieved by controller 248 providing a well-time gating signal S2 to PM 220 that activates the phase modulator during the short time period within which pulse P2 passes through PM 220.

Now-modulated pulses P1 and P2 continue on to optical system 206. Optical system 206 combines the pulses and directs the combined pulse out of output end 208C to detector 216. Detector 216 receives the combined pulse and outputs a signal to controller 248 corresponding to the relative phases imparted to pulses P1 and P2 by PM's 266 and 206, respectively.

WDD Operational Embodiments

When Bob and Alice initiate the exchange of weak pulses in the process of establishing a quantum key, in one example embodiment WDD 286 is used to count the number of pulses arriving at Alice from Bob, and leaving Alice to go to Bob. This counting is performed when PM 266 is activated to modulate pulse P1.

As mentioned above, Alice's controller 288 sends a well-timed gating signal S1 to activate PM 266 in order to modulate the phase of pulse P1 passing therethrough. However, in an example embodiment, controller 288 also sends a WDD gating signal SD to WDD 286. Signal SD is timed to activate WDD 286 so that a weak probing pulse P3 from Eve, designed to sneak into Alice and detect the phase setting of PM 266 during its brief period of operation, can be detected by WDD 286. In an example embodiment, the optical path lengths between element 260 and WDD 286 and between element 260 and PM 266 are made the same so that gating signals S1 and SD are the same. In the case where the optical path lengths are different, the timing of gating signals S1 and SD is adjusted (i.e., a time delay is introduced) to account for the timing difference.

In the case where element 260 is a beamsplitter, then a fraction of pulses P1 and P2 (e.g., 10%) are directed to WDD 286. This allows the number of pulses arriving at Alice per unit time to be measured. The number of pulses arriving at Alice from Bob on average in a certain time window should be constant in the absence of an eavesdropper, and should not exceed a predefined value. However, if the number of pulses counted by WDD 286 increases beyond the predefined value, then it is assumed that extra pulses are due to an eavesdropper, and the key distribution process is terminated.

Counting the Number of Outgoing Pulses from Alice

In an example embodiment, the number of pulses leaving Alice is also counted. This is done to ensure that Eve is not sending a strong pulse into Alice in a limited number of time slots. Because WDD 286 is a single-photon detector, it is incapable of distinguishing between single and multiple photon pulses.

However, the presence of Eve can be revealed by comparing the average number of photons per time interval (or the average number of counts ("clicks") from WDD 286 over the given time interval for pulses entering Alice ($\mu_{IN}$) and leaving Alice ($\mu_{OUT}$).

Alice's VOA 264 attenuates the pulses passing therethrough to a certain intensity (or number of photons per pulse) before the pulses travel back to Bob. The average number of photons entering and leaving Alice will generally be different over a given time interval in the absence of strong probing pulses due to the attenuation in Alice (i.e., $\mu_{IN} \neq \mu_{OUT}$). However, if Eve launches strong probe pulses into Alice in an attempt to gain information about the state of PM 266, the average number of counts from WDD 286 for pulses leaving Alice will be the same (or nearly so) as that for pulses entering Alice (i.e., $\mu_{IN} \approx \mu_{OUT}$)

Thus, WDD 286 performs a check for Poisson statistics associated with the expected number of photons entering and leaving Alice.

Figure 3A:
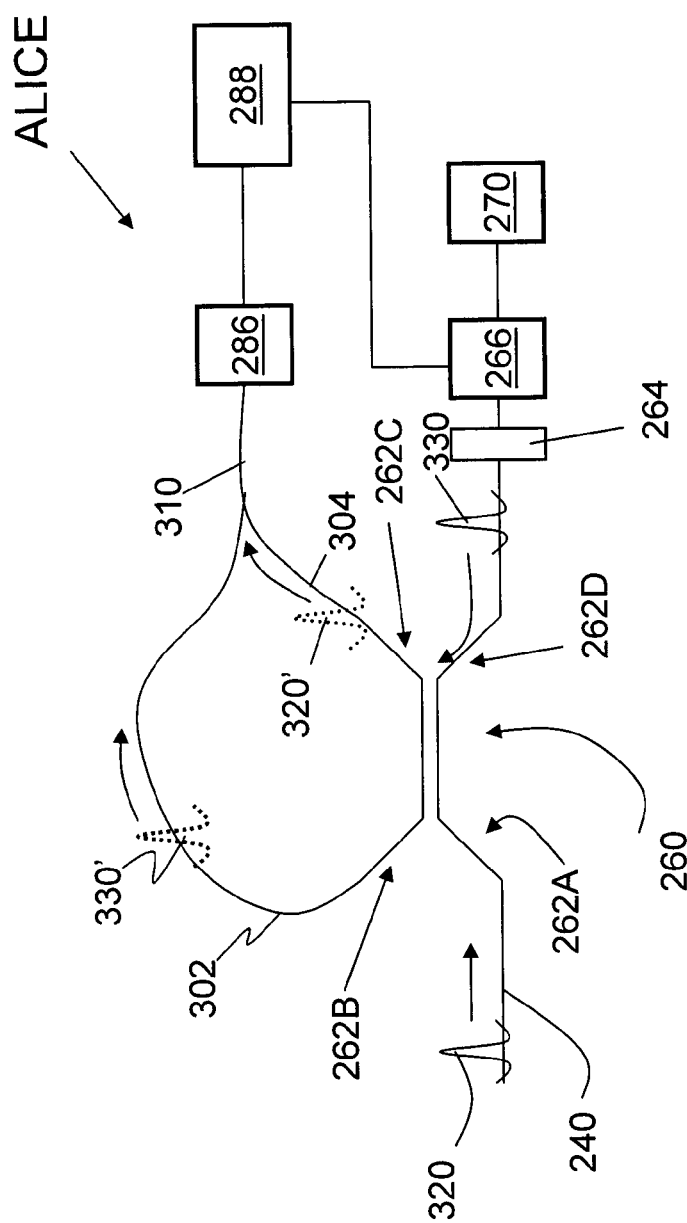
FIG. 3A is a close-up schematic diagram of Alice illustrating an example of an arrangement for counting the number of pulses entering and/or leaving Alice using a single watchdog detector (WDD)

FIG. 3A is a close-up schematic diagram of Alice illustrating an example of an arrangement for counting the number of pulses entering and/or leaving Alice. In FIG. 3, element 260 is a 2×2 coupler with ports 262A-262D. Optical fiber 240 is coupled to port 262A. Optical fiber sections 302 and 304 are coupled to ports 262B and 262C. An additional optical fiber section 306 is coupled to port 262D and connects the coupler to VOA 264, PM 266 and Faraday mirror 270. Optical fiber sections 302 and 304 are spliced into a single fiber section 310, which is optically coupled to WDD 286.

In operation, an incoming pulse 320 is split by element (coupler) 260 so that half of the pulse (indicated by pulse 320') passes through optical fiber section 304 and is detected by WDD 286. Further, an outgoing pulse 330 is split by element (coupler) 260 so that half of the pulse (indicated by pulse 330') travels over optical fiber section 302 and is detected by WDD 286. WDD 286 is gated by controller 288 to discern between incoming and outgoing pulses.

Figure 3B:
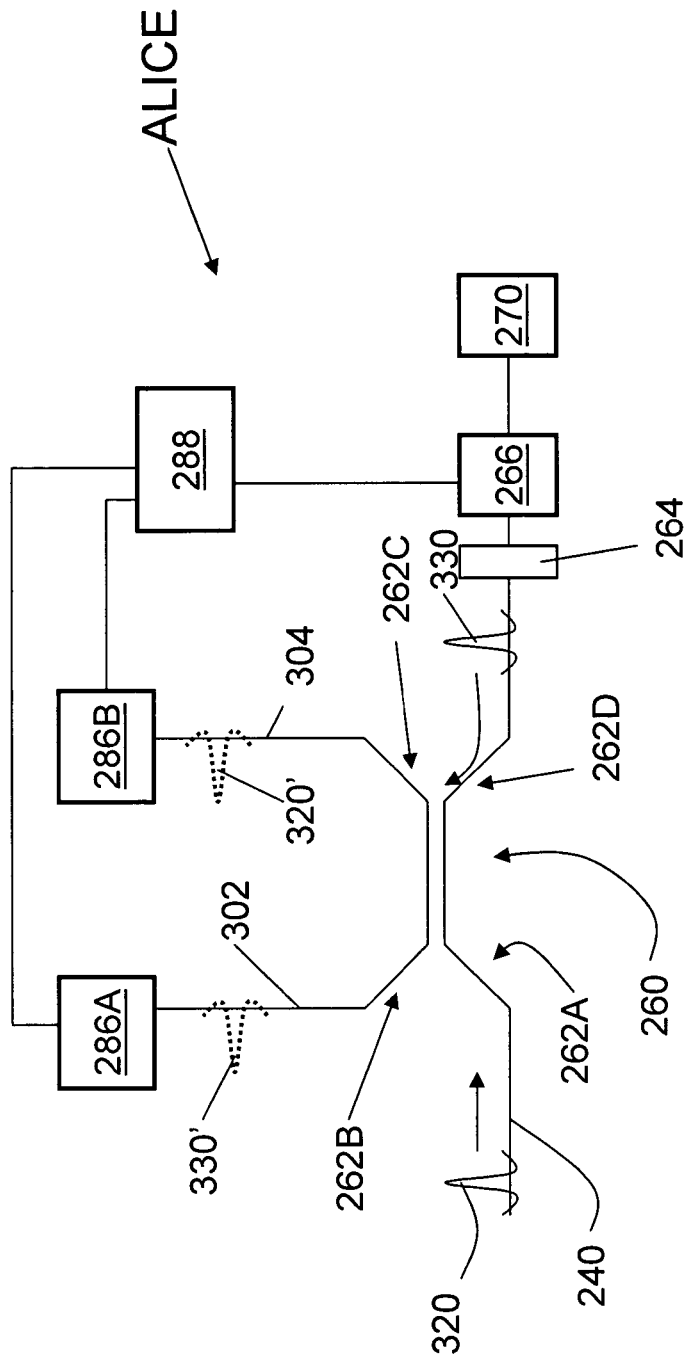
FIG. 3B is a close-up schematic diagram of Alice illustrating an example of an arrangement for counting the number of pulses entering and/or leaving Alice using two WDDs.

In a similar example embodiment illustrated in FIG. 3B, two WDDs 286A and 286B are used, wherein the WDDs are respectively coupled to optical fiber sections 302 and 304.

With reference again to FIG. 1, in another example embodiment, element 260 is an optical switch and incoming and outgoing pulses are counted by randomly activating the switch using controller 288 to direct the optical path from optical fiber 240 to WDD 286. In combination therewith, WDD 286 is gated to detect radiation pulses directed to it. In an example embodiment, a random number generator RNG located in controller 288 is used to choose time bins for both the switching and gating.

Alice and Bob Detector Self-Calibration

A key aspect of maintaining the physical security of system 200 is the ability to separately adjust and calibrate Alice and Bob. Both Alice and Bob are preferably capable of choosing μ independently, without using photons sent through the unsecure optical line. Otherwise, the eavesdropper can change the intensity of the pulses (amplify, substitute, etc.), thereby adulterating the calibration of the nodes and using the pulses for malicious purposes (e.g., increase the power of the probing pulses, or force Alice to use an insecure value of the average number of photons per pulse μ).

Thus, in an example embodiment, photon-emitting device 280 is used to calibrate WDD 286 independent of Bob. To calibrate WDD 286, controller 288 activates photon-emitting device and also optionally controls 260 if this element is an active switch, to establish an optical path between photon-emitting device 280 and WDD 286. In an example embodiment, a variable optical attenuator (VOA) 282 is arranged in front of photon-emitting device 280 to create an output calibration beam BC having single photons or having a select average number of photons per pulse μ (e.g., μ=0.1 photons per pulse).

Similarly, Bob needs to be able to calibrate his detector 216 without using a signal coming from Alice. Thus, in an example embodiment, Bob calibrates his detector by reflecting some or all of one or more optical pulses 204 (or P1 and/or P2) to mirror 230 via element 226, and then to detector 216 via optical system 206. Detector 216 then sends a calibration signal to controller 248, which stores the information embodied in the calibration signal to independently establish the detector calibration. It is worth mentioning that In the BB84 scheme, Bob actually has two detectors that need calibration.

It is assumed here that photon-emitting device 280 and laser 202 each have internal calibration devices. Alternatively, it is assumed that controllers 288 and 248 each have device/laser calibration capability.

Eavesdropping Limitations Imposed by WDD

It is assumed that Eve uses classical pulses for eavesdropping, and that any quantum state she might use is vulnerable to loss. It is also assumed that Alice has loss small enough not to significantly increase Rayleigh scattering, but high enough to destroy the quantum coherence of a quantum-level (i.e., weak) probe pulse used by Eve.

Estimation theory can be used to find a bound on mutual information that Eve can receive via probing Alice for given conditions. Generally, as is described below, information leakage can be taken into account through a privacy amplification stage. It is desirable to carry out the detector calibration steps to minimize possible loopholes that Eve may use to probe Alice, and that she may use to change the quantum efficiency of Bob's detector 216 or WDD detector 286.

First consider the case wherein no optical signals (pulses) are coming from Bob and Alice is measuring both incoming and outgoing signals (it is assumed here that Alice's phase modulator 266 is running). The task here is to calculate the information that the eavesdropper can obtain about the actual phase setting of PM 266 given the mean of the signal of WDD 286. It is convenient to deal with the mean photon number for a given time slot. The mean photon number is denoted as $<n_i>$, where i=A, B, E (Alice, Bob, Eve). The next parameter of the system is the loss in Alice. Alice inserts some loss; otherwise, Eve can use a true single photon source for her measurement and gain advantage. It is assumed that the loss in Alice is relatively small but yet enough to prevent the eavesdropper from taking advantage of using true single photon source or the like.

In the presence of the aforementioned loss at Alice, the best Eve can do is to use a weak coherent pulse source to create a weak probing pulse. Let $L_A$ denotes the one-pass loss in Alice, and assume that Eve is using a weak coherent pulse (WCP) source having an average number of photons $<n_E>$.

It is proper to assume that Eve can resolve all photons coming out of Alice and know for sure if the time slot contains one photon or two photons, etc. It should be noted that if Eve has no quantum non-demolition (QND), then she has to measure all of the time bins. If Eve can resolve the empty and full time bins within Alice, she (Eve) can reduce the number of probing pulses she needs to gain information about the phase of PM 266. Therefore, due to the loss inside the Alice node, the average number of incoming photons can be close to or even higher than one.

The probability of having no pulses for Eve is the no-click probability defined by the Poisson distribution:

$$S_O = \exp(-T_A<n_E>) \quad (0.1)$$

Here, $T_A = (1-L_A)^2$ is the double-pass transparency of Alice. It is assumed that an average number of photons leaving Alice is less than one (i.e., $\mu_{OUT}<1$). Then again, for simplicity, it is assumed that WDD 286 can easily resolve the case where:

$$<n_E> \approx <n_B>. \quad (0.2)$$

Therefore, WDD 286 is able to resolve the double increase in mean photon number $<n_i>$. After the signal leaves Alice, the average number of photons entering Bob is $T_A<n_B>$. The quantity $T_A<n_E>$ is the average number of photons for the probing signal sent by Eve. The average number of photons per pulse entering Bob should be equal to $\mu$—the "magic" photon number that is kept low enough (e.g., $\mu<0.1$) for secure transmission. Therefore, $$T_A<n_B> \approx T_A<n_E>, \quad (0.3)$$

is a good estimate. Now, using the fact that $\mu$ is a small number, the probability of Eve measuring the value of the key in a particular time slot is reduced to $$T_A<n_B> \cdot T_A<n_B> \approx \mu^2. \quad (0.4)$$

Equation (0.4), above, is called the "collision probability." This means that the probability that Eve is measuring the time slot containing at least one photon coming from Alice is less than $\mu$ using this method. Moreover, Eve cannot extract all information from a single photon pulse (specifically, she cannot extract full information in both bases simultaneously).

If $\mu=0.1$, it means that Eve is getting information on ten percent (10%) of the time slots, which can be taken into account during a privacy amplification stage. Ten percent (10%) of information corresponds to five percent (5%) of errors in transmission, which still can be performed by privacy amplification.

Addressing the men-in-the-middle attack, maintaining the level of an outgoing signal at a low level equal to $\mu$, Alice prevents Eve from measuring information in both complementary bases in the same way an eavesdropper does for "ordinary" BB84 protocol (wherein two photon event should be treated in the same manner). Beneficially, physical security again is treated in quantum terms and is protected by the uncertainty principle.

Therefore, it is beneficial for Alice to monitor the incoming light pulses and to keep the outgoing flux at the average intensity of $\mu$ per time slot. In view of the above discussion, this guarantees that mutual information is low enough to be leveraged by privacy amplification. If Eve is trying to probe Alice with a weak coherent pulse, she cannot obtain information beyond a certain bound that depends on the value of $\mu$. Rather, all she is doing is decreasing key rate while leaving the overall security of the QKD system unaffected.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A key encoding station for a two-way quantum key distribution (QKD) system, comprising:
    a phase modulator;
    a Faraday mirror arranged to reflect pulses of radiation arriving from a transmitting/receiving key encoding station through the phase modulator;
    a controller, coupled to the phase modulator, that provides a first gating signal to the phase modulator to activate the phase modulator to modulate one of the pulses of radiation; and
    a single-photon detector coupled to the controller and gated with a second gating signal from the controller to detect radiation pulses entering and/or leaving the reflecting key encoding station in a given time interval, said detector and controller being operable to compare the number of radiation pulses entering and leaving the key encoding station in a given time interval to determine if any of the incoming radiation pulses were not sent by the transmitting/receiving station.

2. A key encoding station according to claim 1, further including a beamsplitter arranged to direct a portion of the radiation pulses to the single-photon detector.

3. A key encoding station according to claim 1, further including a photon-emitting device arranged to provide a calibration radiation beam to the single-photon detector.

4. A key encoding station according to claim 1, including an optical coupler arranged to direct at least a portion of the radiation pulses to the single-photon detector.

5. A key encoding station according to claim 1, including an optical switch arranged to selectively reflect radiation pulses to the single-photon detector.

6. A key encoding station according to claim 1, further including a photon-emitting device optically coupled to the single-photon detector and adapted to emit single-photon pulses in order to calibrate the single-photon detector.

7. A method of improving the security of a two-way quantum key distribution (QKD) system, comprising:
    providing a key encoding station having a single-photon detector; and
    monitoring radiation pulses incoming to and outgoing from the key encoding station in a given time interval using the single-photon detector;
    determining an average number of incoming radiation pulses and an average number of outgoing radiation pulses in the given time interval; and comparing the average number of incoming radiation pulses to the average number of outgoing radiation pulses to detect the presence of an eavesdropper.

8. A method according to claim 7, further including calibrating the single-photon detector with a photon-emitting device located within the key encoding station.

9. A method according to claim 7, including gating the single-photon detector so that the single-photon detector detects radiation pulses corresponding to a time period during which a phase-modulator in the encoding station is activated.

10. A method according to claim 9, including sending a gating pulse from a controller to the single-photon detector to gate the single-photon detector.

11. A method according to claim 7, including:
randomly activating an optical switch to randomly direct some of the incoming radiation pulses to the single-photon detector; and gating the single-photon detector to detect the randomly directed incoming radiation pulses.

12. A method according to claim 11, including:
randomly activating an optical switch to direct some of the outgoing radiation pulses to the single photon detector; and gating the single-photon detector to detect the randomly directed outgoing radiation pulses.

13. A method according to claim 7, including
randomly activating an optical switch to direct some of both the incoming and outgoing radiation pulses to the single-photon detector; and gating the single-photon detector to detect the randomly directed incoming and outgoing radiation pulses.

* * * * *